United States Patent [19]

Lockhart

[11] 4,389,910

[45] Jun. 28, 1983

[54] MOTOR VEHICLE POWER CONTROL MEANS

[75] Inventor: Bruce D. Lockhart, Rochester, Mich.

[73] Assignee: General Motors Corporation, Detroit, Mich.

[21] Appl. No.: 234,696

[22] Filed: Feb. 17, 1981

[51] Int. Cl.³ .............................................. B60K 41/04
[52] U.S. Cl. ....................................... 74/843; 74/866; 364/424.1
[58] Field of Search ....... 364/424.1; 74/843, 860–867, 74/857, 859

[56] References Cited

U.S. PATENT DOCUMENTS

| | | | |
|---|---|---|---|
| 3,890,360 | 6/1975 | Pruvot et al. | 74/857 X |
| 3,893,472 | 7/1975 | Schuster | 74/867 X |
| 4,269,281 | 5/1981 | Schneider et al. | 74/866 X |
| 4,312,249 | 1/1982 | Hau et al. | 74/866 X |
| 4,335,428 | 6/1982 | Miki et al. | 74/866 X |

OTHER PUBLICATIONS

"The Porsche 995 Research Car Power Train" by Flegl et al. 10-31-79 (International Automotive Fuel Conference).
"Optimizing the Engine-Transmission System by Means of an Electronically Controlled Gearbox" by Falzoni et al. 1977 Symposium on Automotive Propulsion Systems.

Primary Examiner—Leslie A. Braun
Assistant Examiner—Frank H. McKenzie, Jr.
Attorney, Agent, or Firm—Mark A. Navarre

[57] ABSTRACT

A power control system for a motor vehicle engine and fluid pressure automatic transmission wherein the engine power control setting is adjusted to bring about correspondence between the actual driveline power output and the requested power output indicated by the accelerator pedal position. A follow up control system adjusts the transmission throttle valve cable according to the accelerator pedal position except under engine operating conditions associated with reduced fuel efficiency at which time the follow up control system is interrupted and the throttle valve cable is adjusted to initiate a downshift in the transmission. The follow up control system is reestablished when the available power output in the higher gear is sufficient to satisfy the requested power output in an efficient manner.

5 Claims, 3 Drawing Figures

MOTOR VEHICLE POWER CONTROL MEANS

This invention relates to a power control system for a motor vehicle engine and fluid pressure automatic transmission, and more particularly to a control system for adjusting the engine throttle and transmission gear ratio selection in a manner to achieve a fuel efficient power output response corresponding to that requested by the operator of the motor vehicle.

In a conventional motor vehicle having an internal combustion engine and a fluid pressure automatic transmission, the engine throttle position is directly controlled by the operator of the vehicle through an accelerator pedal and a mechanical linkage therebetween. The automatic transmission has several gear ratios and gear engagement is controlled by a plurality of shift valves which direct fluid pressure to various band and clutch elements in the transmission. The position of each shift valve is determined by the resultant of forces acting on opposing faces of the valve spool. A spring tends to bias the valve to a closed position while a fluid pressure developed as a function of the vehicle speed (governor pressure) tends to bias the valves to an open position to direct fluid pressure to the associated band or clutch devices to shift transmission gear ratios. A second fluid pressure developed as a function of the engine throttle position (TV pressure) assists the spring force to allow shifting at higher vehicle speeds with greater throttle openings. The TV pressure is developed in the transmission with a throttle valve and a cable (TV cable) connects the throttle valve to the engine throttle plate so that the movement of the engine throttle plate via the accelerator pedal varies the magnitude of the TV pressure.

If the accelerator pedal position is viewed as an indication of the driveline power output requested by the operator of the vehicle, the conventional engine throttle and transmission gear ratio controls tend to provide a nonlinear response between the actual engine power output and the requested power output. As a result, the operator of the vehicle tends to compensate for the nonlinearity by making further accelerator adjustments and the actual engine power output often overshoots the requested power output. This problem is pronounced in larger cars having small engines and low final drive ratios, and tends to reduce the fuel economy that would otherwise be obtained. Accordingly, it has been proposed to adjust a motor vehicle engine throttle position and transmission gear ratio selection in a manner to develop a driveline power output corresponding to that requested by the operator of the motor vehicle through his or her manipulation of the accelerator pedal. However, such proposals do not utilize conventional motor vehicle drivetrain components such as the present day fluid pressure automatic transmission described above. As a result, the expense of implementing such a control system outweighs the benefits of improved driveability and increased efficiency.

Accordingly, it is an object of this invention to provide a fuel efficient control system for a conventional motor vehicle drivetrain having an engine and an automatic transmission wherein the driveline power response varies as a substantially linear function of the accelerator pedal position chosen by the operator of the vehicle.

It is a further object of this invention to provide an electronic control system for a conventional motor vehicle drivetrain having an engine and a fluid pressure transmission wherein the engine throttle setting is adjusted to bring the actual driveline power output into correspondence with the requested power output and wherein the transmission TV cable is controlled as a function of the requested power output except during engine operation with throttle openings at or near wide open that are associated with reduced fuel efficiency at which time the TV cable is adjusted to force a downshift to improve the engine fuel efficiency while satisfying the requested power output.

It is a further object of this invention to provide an electronic control system for a conventional motor vehicle drivetrain having an engine and a transmission wherein a follow up control system adjusts the transmission TV cable according to the position of the accelerator pedal except during engine operation under conditions resulting in reduced fuel efficiency at which time the follow up control system is disabled and the TV cable is adjusted to force a downshift.

It is a further object of this invention to provide an electronic control system for a conventional motor vehicle engine and fluid pressure transmission wherein a follow up control system adjusts the transmission TV cable according to the position of an accelerator pedal except during engine operation under conditions associated with reduced fuel efficiency at which time the follow up control system is disabled and the TV cable is adjusted to force a downshift, and wherein the follow up control system is reestablished to permit upshifting only after it is determined that the maximum driveline power available in the previously engaged gear exceeds the requested power output.

These objects are carried forward with an electronic control system responsive to the actual engine power output and to the requested driveline power output as indicated by the position of the operator-manipulated accelerator pedal. Preferably, the relationship between the accelerator pedal position and the requested power output value is a linear one. The engine throttle is adjusted in a manner to bring the driveline power output into correspondence with the requested power output, and at the same time a follow up control system adjusts the transmission TV cable position according to the accelerator pedal position to provide transmission upshifts and downshifts at the conventional shift points. When the engine manifold absolute pressure (MAP) reaches a reference value beyond which fuel economy is significantly reduced, the follow up control system is disabled and the transmission TV cable is adjusted to force a downshift to a lower gear. When the lower gear is engaged, the throttle setting is reduced to provide the same driveline power at a more favorable fuel efficiency. When it is determined that the maximum driveline power available in a higher gear exceeds the requested power output without exceeding the reference engine MAP, the follow up control system is reestablished to allow an upshift to the higher gear. If a downshift is not available when the TV cable is adjusted to force a downshift, the engine throttle position may be adjusted to the wide open setting to provide maximum engine performance even though the reference engine MAP value is exceeded.

In view of the foregoing, it will be understood that the term "lower gear" refers to a gear having a lower numerical designation. For example, first gear is a "lower gear" than second gear, even though the gear *ratio* of first gear is higher. Similarly, second gear is a "higher gear" than first gear, even though the gear *ratio* of second gear is lower.

In so doing, the control system of this invention provides a more responsive and linear relation between the accelerator pedal position and the driveline power response than is obtained with conventional motor vehicle controls. Moreover, the power control system of this invention improves the motor vehicle fuel economy by controlling transmission shifting in a manner to prevent engine operation under conditions of reduced fuel efficiency except when full engine power is requested. The term "driveline power" refers to the power at the transmission output. The requested driveline power may be achieved by adjusting engine throttle position and/or transmission gear engagement. As described herein, the control system of this invention adjusts engine throttle and transmission gear selection in a manner to achieve the requested power output, while at the same time, avoiding engine operation under conditions of reduced fuel efficiency. As will be later discussed, the term "torque" may be more suitable than "power" depending upon the manner in which the actual driveline parameter is measured.

IN THE DRAWINGS

Figure 1:
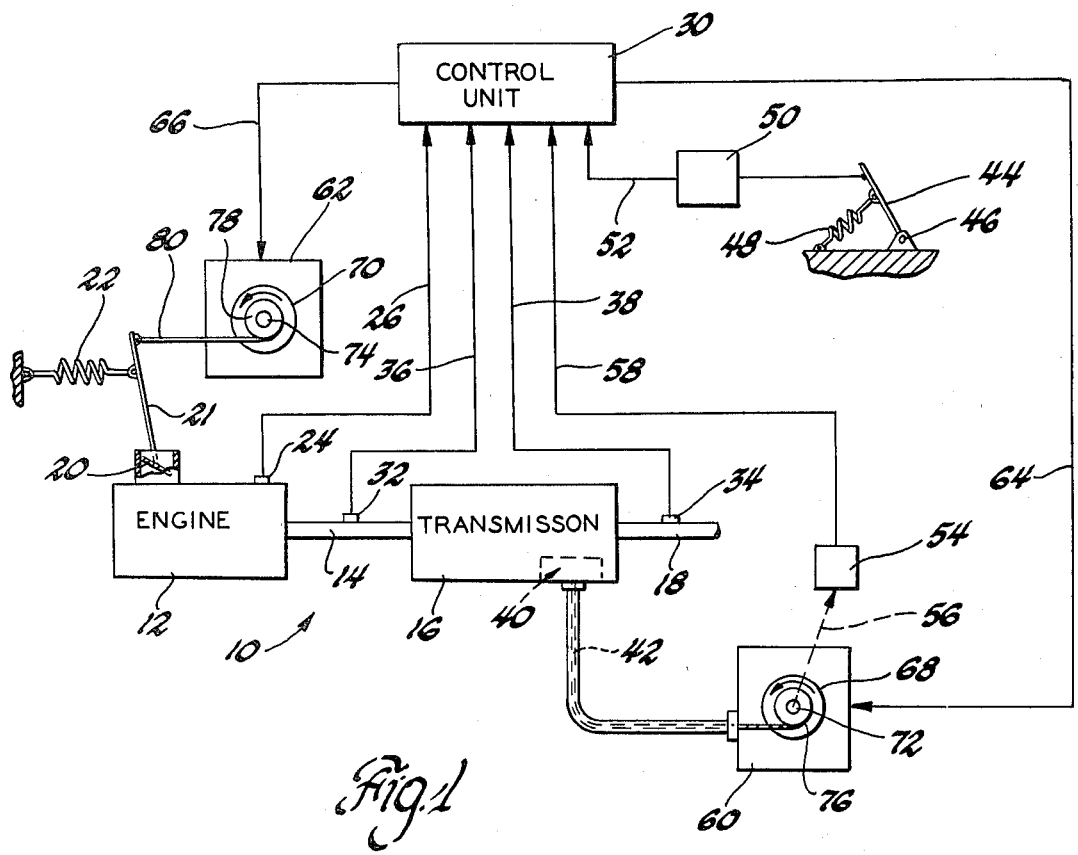
FIG. 1 is an overall schematic diagram of the control system of this invention.

Referring now more particularly to FIG. 1, reference numeral 10 generally designates a motor vehicle drivetrain comprising an engine 12, an engine output shaft 14, a hydraulic multigear ratio automatic transmission 16, and an output shaft 18 adapted to propel the vehicle. Engine 12 is illustrated as an internal combustion engine having a throttle plate 20 for adjusting the engine power output. Linkage member 21 is connected to throttle plate 20 for controlling its position and spring 22 is connected between a fixed support and linkage member 21 in a manner to urge throttle plate 20 to a closed position. Pressure sensor 24 is responsive to the engine manifold absolute pressure (MAP) and provides an input signal to control unit 30 in accordance therewith via line 26. Speed transducers 32 and 34 are responsive to the rotational speeds of output shafts 14 and 18 and provide input signals in accordance therewith to control unit 30 via lines 36 and 38. Pickups 32 and 34 may be any transducers adapted to provide a digital output signal corresponding to the angular velocity of a rotating shaft, one such transducer being a variable reluctance magnetic pickup cooperating with a toothed gear fixed to the rotating shaft.

As will be explained in reference to FIG. 3, control unit 30 uses the input parameters of engine speed and MAP to determine the actual power output of engine 12. It should be appreciated, however, that this invention equally applies to motor vehicles having other types of power plants, such as an excess air engine. Accordingly, input transducers of a different nature (such as an injector rack sensor) may be required to enable control unit 30 to determine the actual power output of the power plant.

Reference numeral 40 generally designates a hydraulic throttle valve assembly within transmission 16 for developing a variable fluid pressure (TV pressure) in transmission 16 as a function of the position of throttle valve (TV) cable 42, hereinafter referred to as TV cable 42. Throttle valve assembly 40 is a standard transmission component and will be more fully described in reference to FIG. 2.

Accelerator pedal 44 pivots about pin 46, and spring 48 urges pedal 44 to the upright position as shown. The position of pedal 44 is manipulated by the operator of the vehicle to provide an indication of the desired driveline power output and transducer 50 is responsive to the movement of pedal 44 for providing an electrical signal in accordance therewith to control unit 30 via line 52. Transducer 50 may be any device meeting the above requirements, one such device being a rotary potentiometer with its wiper blade connected to pedal 44.

Motor units 60 and 62 are actuated by control unit 30 via lines 64 and 66 to control the position or setting of transmission TV cable 42 and engine throttle plate 20. Motor units 60 and 62 each comprise an electric motor 68 or 70 having an output shaft 72 or 74 and a pulley 76 or 78 rigidly connected thereto. Although the specific nature of electric motors 68 and 70 is not crucial to this invention, motor 68 is preferably a DC permanent magnet motor and motor 70 is preferably a Stepper motor such as the model No. K82954-M3 Stepper motor manufactured by North American Phillips, Inc., Cheshire, Conn.

Cable 80 is connected to linkage member 21 and to pulley 78 as shown so that when control unit 30 actuates electric motor 70 in a counterclockwise direction, linkage member 21 is moved against the force of spring 22 to open the setting of throttle plate 20. When motor 70 is actuated in a clockwise direction, spring 22 and linkage member 21 move throttle plate 20 toward the closed position. In the event of an electrical failure, spring 22 operates to return throttle plate 20 to the fully closed position. TV cable 42 is connected to pulley 76 so that when control unit 30 actuates motor 68, TV cable 42 is moved to change the TV pressure in transmission 16. Transducer 54 is responsive to the angular position of motor output shaft 72 as indicated by dashed line 56 and provides an electrical signal in accordance therewith to control unit 30 via line 58. Transducer 54 may thus be a rotary potentiometer having its wiper connected to output shaft 72.

Figure 2:
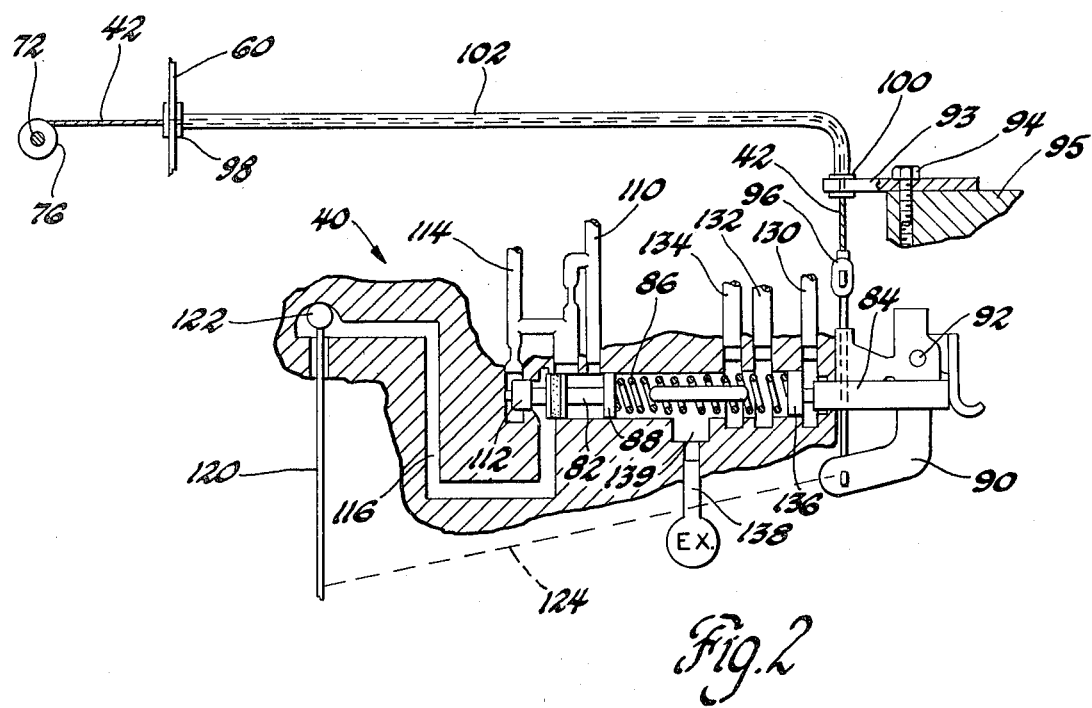
FIG. 2 illustrates the transmission throttle valve and the associated control elements.

FIG. 2 illustrates a transmission throttle valve for a fluid pressure automatic transmission such as the THM 200 transmission, manufactured by Hydra-Matic Division of General Motors Corporation, Ypsilanti, Mich., and described in detail in the U.S. patent to Schuster U.S. Pat. No. 3,893,472 issued July 8, 1975. Although throttle valves vary somewhat from transmission to transmission, their purpose is essentially the same and the throttle valve depicted in FIG. 2 is considered to be illustrative of transmission throttle valves in general. The control elements depicted in both FIG. 1 and FIG. 2, such as TV cable 42 and motor unit 60, have been assigned corresponding reference numerals.

Spool 82 and plunger 84 are slidably disposed in the valve bore of throttle valve 40 and spring 86 is disposed therebetween for applying a variable force to spool land 88 as a function of the axial position of plunger 84. Control lever 90 is adapted to pivot about pin 92, and in so doing, controls the axial position of plunger 84 within the valve body. TV cable 42 is connected through transmission bracket 93 and connector 96 to control arm 90 as shown. TV cable 42 thus operates against the force of spring 86 to control the axial position of plunger 84 within the valve body. Cable connectors 98 and 100 secure the cable housing 102 to motor unit 60 and to bracket 93. Screw 94 secures bracket 93 to the transmission case 95 as shown.

Fluid pressure from a conventional hydraulic pump in transmission 16 is applied to fluid passage 110 and acts on spool lands 88 and 112 to urge spool 82 to the right against the force of spring 86. With the spool position shown in FIG. 2, the fluid pressure in passage 110 is applied directly to the TV outlet passage 114 through the valve body so that the TV pressure is at a maximum. If TV cable 42 is adjusted to allow counterclockwise movement of control arm 90, the spring force is lessened and spool 82 moves to the right exposing exhaust passage 116 to decrease the TV pressure in output passage 114. Thus, valve spool 82 moves axially within throttle valve 40 under the influence of the TV cable position in a manner to produce a TV output pressure in passage 114 that is proportional thereto. When TV cable 42 is pulled against the force of spring 86 the TV pressure increases and when TV cable 42 is let out, the TV pressure decreases. In a conventional motor vehicle TV cable 42 is connected directly to engine throttle plate 20 so that the TV pressure in output passage 114 varies directly as a function of the engine output torque. In this invention, however, the position of TV cable 42 is controlled by control unit 30 through the actuation of motor unit 60.

TV exhaust lifter 120 and stopcock ball 122 which is connected thereto are mechanically connected to control lever 90 as indicated by dashed line 124. Should TV cable 42 become disconnected from lever arm 90, allowing spring 86 to rotate control arm 90 counterclockwise, lifter 120 and stopcock ball 122 are lowered to block exhaust passage 116. Otherwise, the TV pressure would drop to an unacceptably low value, significantly lowering the transmission shift point speeds and torque capacity. Since ball 122 blocks exhaust passage 116, however, the TV pressure is maintained at a high value under such circumstances.

As noted before, TV output passage 114 is connected to the various transmission shift valves to influence the shift points as a function of the position of TV cable 42. In addition, the TV pressure may be applied to passage 130 of throttle valve 40 to further influence the shifting of the transmission as a function of the position of TV cable 42. In the THM 200 transmission, for example, a limited TV pressure signal (shift-TV) is applied to passage 130 for application to the various transmission shift valves (not shown) through outlet passages 132 and 134 when the position of plunger land 136 permits. Passage 132 is connected to the 2-3 shift valve to enable a partthrottle 3-2 downshift when TV cable 42 moves plunger land 136 sufficiently to provide a fluid path between passages 130 and 132. Passage 134 is connected to each of the shift valves to enable a detent downshift to the lowest gear ratio available when plunger land 136 is moved sufficiently to provide a path between passages 130 and 134. Exhaust passage 138 drains leakage oil from chamber 139.

It will be appreciated that this invention is not limited to the use of the specific throttle valve depicted and described in reference to FIG. 2. Rather, the control concept of this invention applies to any automatic shift transmission having a control input for biasing gear ratio shifting in the transmission. According to the preferred embodiment of this invention, the control input is a conventional TV cable and the position of the TV cable is adjusted in a manner to accomplish the power control functions developed in control unit 30.

Control unit 30 normally controls the TV cable position according to the position of accelerator pedal 44. At the same time a follow up control system is established to adjust the setting of engine throttle plate 20 in a manner to bring the driveline power output into correspondence with the requested power output set by the operator of the vehicle through manipulation of accelerator pedal 44. In this mode of operation, upshifting and downshifting in transmission 16 may occur in a conventional manner and the actual driveline power output linearly corresponds to the setting of accelerator pedal 44. When the engine MAP is raised above a reference value however, the engine fuel efficiency is significantly reduced and control unit 30 forces a downshift by interrupting the follow up control system, and by actuating motor unit 60 to pull TV cable 42 to increase the TV pressure until a downshift occurs. Since the downshift increases engine speed, the throttle opening may be reduced to a more fuel efficient setting while still maintaining the requested power output. When it is determined that the requested power output may be obtained in a higher gear without exceeding the reference MAP value, the follow up control system between accelerator pedal 44 and TV cable 42 is reestablished to allow an upshift. If motor unit 60 pulls the TV cable 42 to force a downshift, but no downshift is available (due to vehicle speed, for example) control unit 30 is permitted to adjust engine throttle plate 20 up to the wideopen position for maximum performance. It will be appreciated that if desired, a reference engine throttle position may be used in place of the reference engine MAP value referred to above.

Although the above described control sequence may be performed with a variety of control and logic devices, it is preferably performed with a programmed digital microprocessor and the necessary support devices such as the 6800-series family of integrated circuits manufactured by Motorola SemiConductor Products Incorporated, Phoenix, Ariz. Accordingly, a flow diagram for implementing the control functions of this invention on a programmed digital microprocessor is shown in FIG. 3. The task of translating the flow diagram into a coded program instruction set suitable for programming a specific microprocessor is considered to be within the capability of a person possessing average skill in the art of computer programming.

Figure 3:
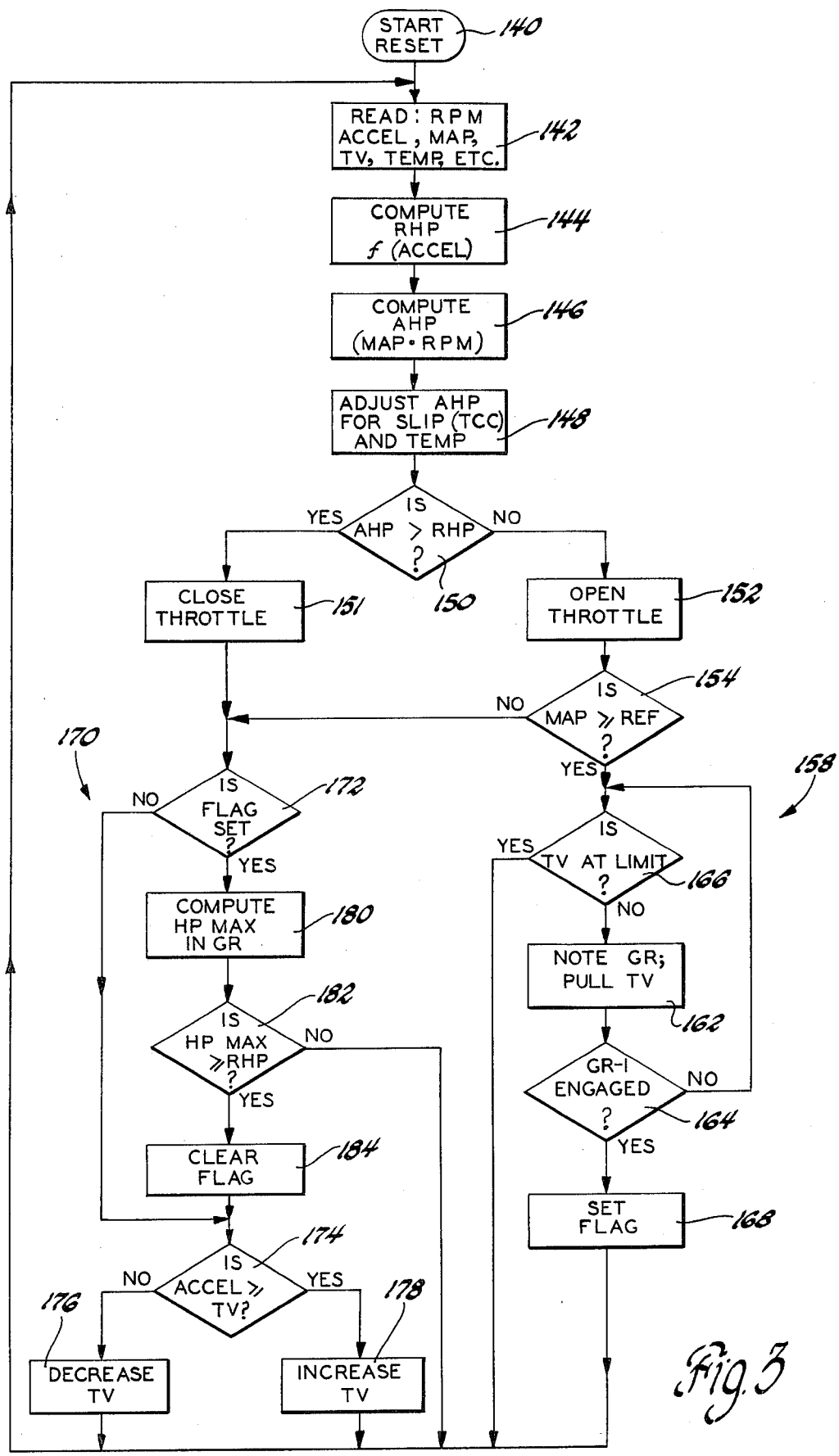
FIG. 3 is a flow diagram for implementing the control function of this invention with a programmed digital microprocessor.

Referring now more particularly to FIG. 3, reference 140 designates a start-up instruction set to be executed each time the motor vehicle is started. It will be appreciated that such instructions operate to reset various control and input registers. The input parameters, such as MAP, accelerator pedal position, engine temperature (TEMP), and the various shaft speeds, are read and stored for future processing as indicated at block 142. At block 144, the requested power output (RHP) is determined as a substantially linear function of the available engine power output and the accelerator pedal setting chosen by the operator of the vehicle. The actual engine power output (AHP) is computed as the product of engine MAP and engine RPM, as indicated at block 146. It will be understood that the engine power output could be computed in another manner but that the method described above is preferred. By way of example, another method of obtaining the actual engine power output is to obtain the product of engine RPM and airflow volume. The engine power output value is then adjusted to compensate for engine and transmission losses, such as torque converter slip and engine temperature as indicated in block 148. In this regard it will be appreciated that for a motor vehicle incorporating a torque converter clutch a signal may be provided to control unit 30 for indicating engagement of the clutch since there is no torque converter slip when the clutch is engaged. Neglecting friction losses, the compensated AHP value thus represents the actual driveline power output. At block 150, the actual power output value is compared with the requested power output to determine the direction of throttle adjustment required to bring about correspondence between the two values. If the actual power output exceeds the requested power output, motor unit 62 is actuated in a manner to move engine throttle plate 20 toward the closed position as indicated at block 151. If motor 70 is a Stepper motor, the block 151 instructions operate to rotate motor output shaft 74 one step in the clockwise direction. If the requested power output exceeds the actual power output, motor unit 62 is actuated in a manner to rotate motor output shaft 74 one step in the counterclockwise direction to open engine throttle plate 20, as indicated at block 152. If the throttle setting is opened to increase the power output of engine 12, the engine MAP value is compared with a predetermined reference MAP value at block 154. The reference MAP value corresponds to an engine throttle setting near wide-open throttle. Since engine operation at MAP values exceeding the reference value result in reduced fuel efficiency, the program steps designated generally by reference numeral 158 operate to adjust TV cable 42 in a manner to initiate a downshift in transmission 16 to a lower gear. When the lower gear is engaged, the engine throttle setting may be decreased to provide the same driveline power output, thereby improving the engine fuel efficiency. To initiate the downshift, motor 68 is energized in the counterclockwise direction to pull TV cable 42 against the force of spring 86 to increase the TV pressure, as indicated at block 162. The gear (GR) engaged at this point is noted so that a subsequent downshift may be detected. Control unit 30 continues to pull TV cable 42 until a downshift occurs (detected at block 164) or until the maximum TV cable position is reached (detected at block 166). The engagement of a particular gear may be detected by determining the speed ratio of output shafts 14 and 18 and by comparing the ratio to known gear ratio values or alternately, by detecting the apply pressure on the various transmission clutch elements. The TV cable limit may be detected by comparing the output signal of transducer 54 with a reference value corresponding to the limit position. Once a downshift occurs, a flag or control register is set, as indicated at block 168. If TV cable 42 is pulled to its limit position and no downshift occurs, control unit 30 continues to open engine throttle plate 20 in order to satisfy the requested power output even though the reference MAP value is exceeded.

Following the execution of the block 151 instructions or following a negative decision at block 154, the instructions designated generally by reference numeral 170 are executed. First, the block 172 instructions determine whether the downshift flag is set. If not, the accelerator pedal position is compared with the TV cable position as indicated at block 174. If the accelerator pedal setting exceeds the setting of TV cable 42, motor unit 60 is actuated in a counterclockwise direction to increase the TV pressure as indicated at block 178. If, on the other hand, the TV cable setting exceeds the setting of accelerator pedal 44, motor unit 60 is actuated in a clockwise direction to decrease the TV pressure, as indicated at block 176. It will be recognized that the program instructions designated by block 174, 176 and 178 establish a follow up control system whereby TV cable 42 is adjusted to track the position of accelerator pedal 44.

If the instructions comprising block 172 are executed following a forced downshift, the decision is answered in the affirmative and control unit 30 proceeds to determine the maximum power output available in the previously engaged gear (GR), as indicated at block 180. The maximum power output value may be determined by obtaining the product of the vehicle speed (from sensor 34), the respective gear ratio value (a known constant) and the reference engine MAP value. The maximum power output value so determined is then compared with the requested power output as indicated at block 182. If the requested power output exceeds the maximum available power output in the previously engaged gear (GR), TV cable 42 is maintained at its existing setting to maintain engagement of the lower gear (GR-1). If, on the other hand, the maximum available power output in the gear ratio GR exceeds the requested horsepower, the downshift flag is cleared as indicated at block 184 and the follow up control system between accelerator pedal 44 and TV cable 42 is reestablished. In view of the foregoing, it will be understood that the determination of the maximum available power output in the higher gear is necessary to prevent hunting or oscillation between gears GR and GR-1.

The operation of the control system of this invention will now be described. When the operator of the motor vehicle energizes the vehicle ignition system, the start instructions designated at block 140 of FIG. 3 are executed to reset and initialize the control registers of control unit 30. The transmission gears are engaged in a conventional manner and when the operator depresses accelerator pedal 44, control unit 30 actuates motor units 60 and 62 in a manner to (1) adjust the setting of TV cable 42 according to the position of accelerator pedal 44 and (2) adjust the setting of engine throttle plate 20 in a manner to cause the actual driveline power output to correspond to the requested power output determined from the setting of accelerator pedal 44. As long as the engine MAP value as sensed by sensor 24 does not exceed the reference MAP value, the follow up control system between accelerator pedal 44 and TV cable 42 is maintained. If, however, the accelerator pedal position chosen by the operator of the vehicle results in an engine throttle setting that increases the engine MAP value beyond the reference MAP value, the follow up control system is interrupted and control unit 30 pulls TV cable 42 to force a downshift. The reference engine MAP value thus defines a region of engine operation for which the fuel efficiency may be increased at the same engine power output by forcing a downshift to increase the engine speed and thereby decrease the engine throttle setting. If a downshift is not available, control unit 30 is permitted to increase the throttle setting despite the fuel efficiency penalty to provide the maximum engine power output. If a downshift occurs, however, the engine throttle setting may be reduced while maintaining the requested power output, and control unit 30 monitors the maximum available engine power output in the higher gear. As the engine speed increases, or, as the requested power output is decreased, the maximum available engine power output in the higher gear eventually exceeds the requested power output, and upon detecting this condition, control unit 30 reestablishes the follow up control system between accelerator pedal 44 and TV cable 42 to permit an upshift to the higher gear. This feature allows the upshift to occur as soon as possible for maximum fuel economy while preventing upshift/downshift hunting.

This invention has been described in reference to a preferred embodiment wherein the accelerator pedal setting is viewed as an indication of the requested driveline power and wherein the engine throttle setting and transmission gear selection are controlled to bring a measured value of driveline power output into correspondence therewith. In order to accurately determine the actual driveline power, however, the measured engine power output value must be compensated for frictional and slippage losses in the transmission. Such compensation is performed by control unit 30, as generally indicated at instruction block 148 of FIG. 3. However, this invention is equally applicable to a system wherein the controlled parameter is driveline torque, it being understood that power is a direct function of torque and speed. In such a system the accelerator pedal is viewed as an indication of the requested driveline torque and the engine throttle setting and transmission gear selection are controlled to bring a measured value of driveline torque into correspondence with the requested value. When the controlled parameter is driveline torque no compensation of the measured torque value is required if the point of measurement is between the transmission and the driving wheels. It will be understood that further modifications of this nature will occur to those skilled in the art and that such modifications are considered to be within the scope of this invention, which is limited only by the appended claims.

The embodiments of the invention in which an exclusive property or privilege is claimed are defined as follows:

1. A method of controlling the driveline power response of a motor vehicle of the type having a throttle controlled engine and a multigear ratio automatic transmission wherein transmission gear shifting is determined according to the combination of vehicle speed and a control input applied to said transmission, said method comprising the steps of:
   adjusting the engine throttle in a manner to bring a measured value of a power-related driveline parameter into correspondence with a requested value determined according to the setting of an operator controlled accelerator pedal;
   adjusting said transmission control input according to a first schedule wherein said input follows the setting of said accelerator pedal or a second schedule effective when engaged to interrupt said first schedule and to adjust said control input in a manner to downshift said transmission to a lower gear;
   engaging said second schedule when said engine enters a range of operation associated with reduced efficiency;
   in response to the engagement of said second schedule, determining the maximum value of said driveline parameter available in a higher gear with engine operation outside said fuel inefficient range; and
   disengaging said second schedule when said maximum value exceeds said requested value whereby said engine and transmission are controlled in a manner to deliver a driveline response corresponding to the position of said accelerator pedal while avoiding engine operation under conditions of reduced efficiency.

2. In a motor vehicle of the type including a throttle-controlled internal combustion engine wherein engine operation is relatively inefficient in a range of load conditions, the vehicle having an operator controlled accelerator pedal, and a multiple gear ratio transmission drivingly connected to propel the vehicle, transmission gear shifting being controlled according to the combination of vehicle speed and a control input, the improvement comprising:
   means including a control unit for establishing a follow-up control between the transmission control input and the operator controlled accelerator pedal so that transmission gear shifting is determined by vehicle speed and accelerator pedal setting without regard to the engine throttle position, for adjusting the engine throttle so as to bring an instantaneous measure of a power-related driveline parameter into correspondence with a desired value determined by the setting of said accelerator pedal, and when said engine is operating in said relatively inefficient range of load conditions, for interrupting said follow-up control and varying said control input in a manner to bias the transmission toward a lower gear.

3. In a motor vehicle of the type including a throttle-controlled internal combustion engine wherein engine operation is relatively inefficient in a range of load conditions, the vehicle having an operator controlled accelerator pedal, and a multiple gear ratio transmission drivingly connected to propel the vehicle, transmission gear shifting being controlled according to the combination of vehicle speed and a control input, the improvement comprising:
   means including a control unit for establishing a follow-up control between the transmission control input and the operator controlled accelerator pedal so that transmission gear shifting is determined by vehicle speed and accelerator pedal setting without regard to the engine throttle position, for adjusting the engine throttle so as to bring an instantaneous measure of the driveline power output into correspondence with a desired power output value determined by the setting of said accelerator pedal, and when said engine is operating in said relatively inefficient range of load conditions, for interrupting said follow-up control and varying said control input in a manner to shift the transmission to a lower gear, said follow-up control being reestablished to shift the transmission to a higher gear when it is determined that the desired power output value may be achieved in such higher gear without operating the engine in said relatively inefficient range, whereby said engine and transmission are controlled in a manner to deliver a driveline response corresponding to the position of said accelerator pedal while avoiding operation under conditions of reduced engine efficiency.

4. In a motor vehicle of the type including a throttle-controlled internal combustion engine wherein engine operation is relatively inefficient in a range of load conditions, the vehicle having an operator controlled accelerator pedal, and a multiple gear ratio transmission drivingly connected to propel the vehicle, transmission gear shifting being controlled according to the combination of vehicle speed and a control input, the improvement comprising:

means including a control unit for establishing a follow-up control between the transmission control input and the operator controlled accelerator pedal so that transmission gear shifting is determined by vehicle speed and accelerator pedal setting without regard to the engine throttle position, for determining the actual driveline power output by measuring the engine power output and compensating such measure for losses in the transmission, for adjusting the engine throttle so as to bring the actual driveline power output into correspondence with a desired power output value determined by the setting of said accelerator pedal, and when said engine is operating in said relatively inefficient range of load conditions, for interrupting said follow-up control and varying said control input in a manner to shift the transmission to a lower gear, said follow-up control being reestablished to shift the transmission to a higher gear when it is determined that the desired power output value may be achieved in such higher gear without operating the engine in said relatively inefficient range, whereby said engine and transmission are controlled in a manner to deliver a driveline power output corresponding to the position of said accelerator pedal while avoiding engine operation under conditions of reduced efficiency.

5. In a motor vehicle of the type including an internal combustion engine having a power control mechanism wherein engine operation is relatively inefficient in a range of load conditions, the vehicle having an operator controlled accelerator pedal, and a multiple gear ratio transmission drivingly connected to propel the vehicle, transmission gear shifting being controlled according to the combination of vehicle speed and a control input, the improvement comprising:

electrically energizable means for adjusting said transmission control input to bias transmission gear shifting;

means including a control unit for energizing said electrically energizable means to establish a follow-up control between the transmission control input and the operator controlled accelerator pedal so that transmission gear shifting is determined by vehicle speed and accelerator pedal setting without regard to the engine throttle position, for adjusting the engine power control mechanism so as to bring an instantaneous measure of a power-related driveline parameter into correspondence with a requested value determined by the setting of said accelerator pedal, and when said engine is operating in said relatively inefficient range of load conditions, for interrupting said follow-up control and energizing said electrically energizable means in a manner to downshift the transmission toward a lower gear, said follow-up control being reestablished to shift the transmission to a higher gear when it is determined that the driveline parameter value available to such higher gear without operating said engine in said relatively inefficient range of load conditions exceeds the requested value, whereby said engine and transmission are controlled in a manner to deliver a driveline response corresponding to the position of said accelerator pedal while avoiding engine operation under conditions of reduced efficiency.

* * * * *

UNITED STATES PATENT AND TRADEMARK OFFICE
CERTIFICATE OF CORRECTION

PATENT NO. : 4,389,910

DATED : June 28, 1983

INVENTOR(S) : Bruce D. Lockhart

It is certified that error appears in the above—identified patent and that said Letters Patent are hereby corrected as shown below:

Column 12, line 27, "to" should read -- in --.

Signed and Sealed this

Twenty-fifth Day of October 1983

[SEAL]

Attest:

GERALD J. MOSSINGHOFF

Attesting Officer

Commissioner of Patents and Trademarks